United States Patent [19]

Mattes et al.

[11] Patent Number: 5,672,916
[45] Date of Patent: Sep. 30, 1997

[54] SEAT BELT LATCH SENSOR

[75] Inventors: Bernard Mattes, Sachsenheim; Hartmut Schumacher, Freiberg; Werner Nitschke, Ditzingen; Ralf Henne, Sachsenheim, all of Germany

[73] Assignees: Morton International, Inc., Chicago, Ill.; Robert Bosch GmbH, Stuttgart, Germany

[21] Appl. No.: 598,361

[22] Filed: Feb. 8, 1996

[30] Foreign Application Priority Data

Feb. 17, 1995 [DE] Germany ............... 195 05 334.6

[51] Int. Cl.$^6$ ........................................... B60R 21/00
[52] U.S. Cl. ................... 307/10.1; 180/272; 280/735; 280/801.1
[58] Field of Search ........................ 307/9.1, 10.1, 307/121; 180/282, 271, 272; 340/436, 438, 669, 457.1; 280/734, 735, 801.1, 802, 806; 200/61.53, 61.45 R; 324/162

[56] References Cited

U.S. PATENT DOCUMENTS

| | | | |
|---|---|---|---|
| 3,967,237 | 6/1976 | Jenne | 340/457.1 |
| 5,413,378 | 5/1995 | Steffens, Jr. et al. | 280/735 |
| 5,431,446 | 7/1995 | Czarnecki et al. | 280/802 |
| 5,446,442 | 8/1995 | Swart et al. | 340/438 |
| 5,501,486 | 3/1996 | Fujita et al. | 280/735 |
| 5,520,263 | 5/1996 | Suran et al. | 307/10.1 |

*Primary Examiner*—Richard T. Elms
*Attorney, Agent, or Firm*—Taylor J. Ross; Gerald K. White

[57] ABSTRACT

In an electronic device, in particular a piece of safety equipment for vehicle occupants, a switching element (13) which characterizes the operational position of an insertable seat belt is connected in parallel with a firing element (10, 11). The switching element (13) has a break contact which is broken when the seat belt is activated correctly.

16 Claims, 1 Drawing Sheet

SEAT BELT LATCH SENSOR

DESCRIPTION OF THE RELATED ART

Safety equipment for vehicle occupants with an insertable seat belt are known which comprise a switching element which characterizes the operational position of the seat belt. This is intended to permit the operational positions of the seat belt to be detected electronically. The intention is therefore that it will be possible to detect whether the belt is correctly inserted into the belt lock or not when a person has occupied the seat of the vehicle. If appropriate, a warning signal is to be emitted when the seat belt is not inserted correctly. For this purpose, in known electronic devices of this type a switching element which characterizes the operational position of the seat belt is connected in series with the firing element of the output stage of a belt tensioner. This switching element has a make contact which only closes when the seat belt has been correctly inserted into the belt lock. A disadvantage of this known device is the fact that symmetrical line routing between the switching element and the belt tensioner is not possible since the belt tensioner, in particular a shoulder belt tensioner, and the belt lock are spatially separated from one another. As a result, the risk of interference signals being coupled into these lines increases. In addition, a powerful and highly reliable switching element must be used since when the belt tensioner is activated a firing current in the order of magnitude of several amperes must be conducted via it. In order to permit the belt tensioner to be activated even when there is a defect in the switching element, a bypass resistor must also be connected, as an additional component, parallel to the switching element.

SUMMARY OF THE INVENTION

The electronic device according to the invention with the distinguishing features of the claims have, in contrast, the advantage that symmetrical line routing is made possible which is less prone to the coupling-in of electromagnetic interference. Since it is still not necessary for the switching element to conduct any firing current, a more cost-effective switching element which is configured only for weak current loading can be used. Finally, a bypass resistor is not necessary either since it is possible to activate the belt tensioner even when the switching element fails.

BRIEF DESCRIPTION OF THE DRAWINGS

An exemplary embodiment of the invention is illustrated in the drawing and explained in greater detail in the subsequent description.

DETAILED DESCRIPTION OF THE INVENTION

Figure 3:
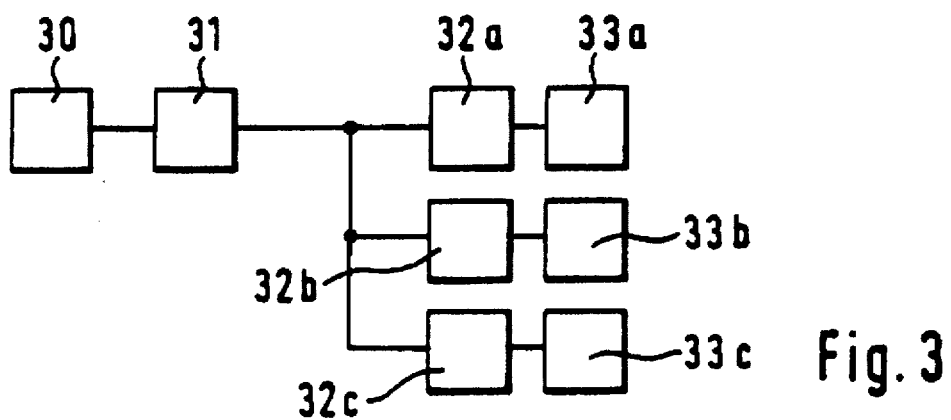

FIG. 3 shows a block circuit diagram of an electronic device, in particular a safety device, for vehicle occupants. This device comprises at least one acceleration-sensitive sensor 30 which emits for example an electrical output signal which corresponds to the acceleration of the vehicle and is further processed and evaluated in an evaluation circuit 31. For example, it is tested in this circuit 31 whether the output signal emitted by the sensor 30 exceeds a prescribed threshold value which indicates an accident event. The evaluation circuit 31 is connected to a plurality of output stages 32a, 32b, 32c which are driven by the circuit 31. These output stages comprise firing elements which, when they are driven, drive restraining means 33a, 33b, 33c for vehicle occupants. These restraining means can be for example so called airbags and/or belt tensioners. Today, modern types of vehicle already have for example at least six such output stages and restraining means: an output stage for the driver airbag and one for the front seat passenger airbag, a further output stage for each of the belt tensioners for the driver and front seat passenger, as well as a further output stage for side airbags for the driver and front seat passenger respectively.

Figure 2:
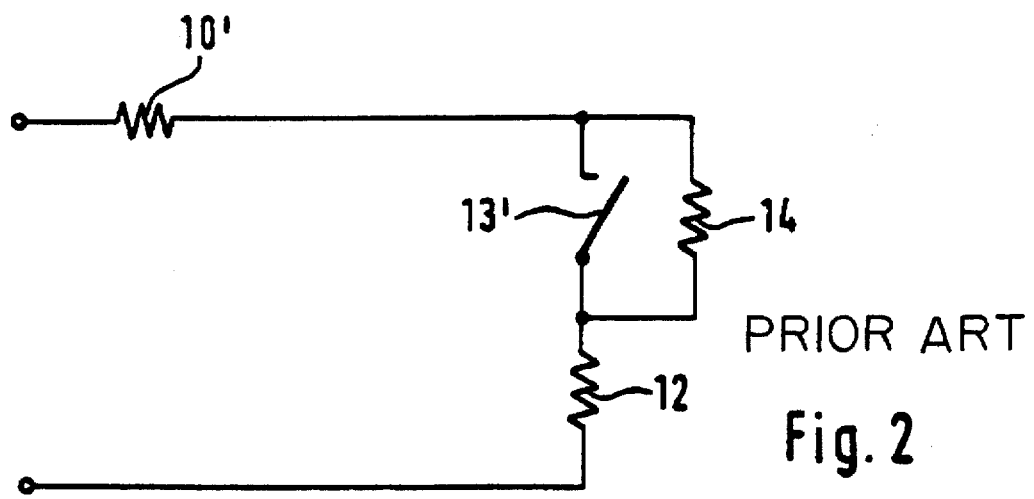
FIG. 2 shows the conventional connection of a switching element in series with a firing element and FIG. 3 shows a block circuit diagram of an electronic device.

FIG. 2 shows the connection of a firing element 10' in a conventional electronic device in conjunction with a switching element 13' which characterizes the operational position of the seat belt. For this purpose, the firing element 10' is connected in series with the switching element 13'. A resistor 12 is also connected in series with the switching element 13'. The switching element 13' is a make contact, that is to say a switching element which closes a circuit when the seat belt is inserted into the belt lock. The firing element 10' is a type of resistance wire which can be heated to a high temperature by current passing through and as a result activates a chemical mixture which emits a large quantity of gas. A bypass resistor 14 is connected in parallel with the switching element 13'. The switching element 13' and firing element 10' are arranged spatially separated from one another in the vehicle. Thus, for example, the firing element 10' is arranged in the belt tensioner while the switching element 13' is located in or on the belt lock. The customary series connection of the firing element 10' to the switching element 13' results in an asymmetrical routing of the firing line, which disadvantageously promotes the coupling-in of interference signals. The additional bypass resistor is necessary to ensure a closed circuit for the activation of the firing element 10' despite a defect in the switching element 13'. Since the switching element 13' has to conduct the comparatively high firing current for the firing element 10', a high-quality switch which transits high current strengths must be used for the switching element 13'.

Figure 1:
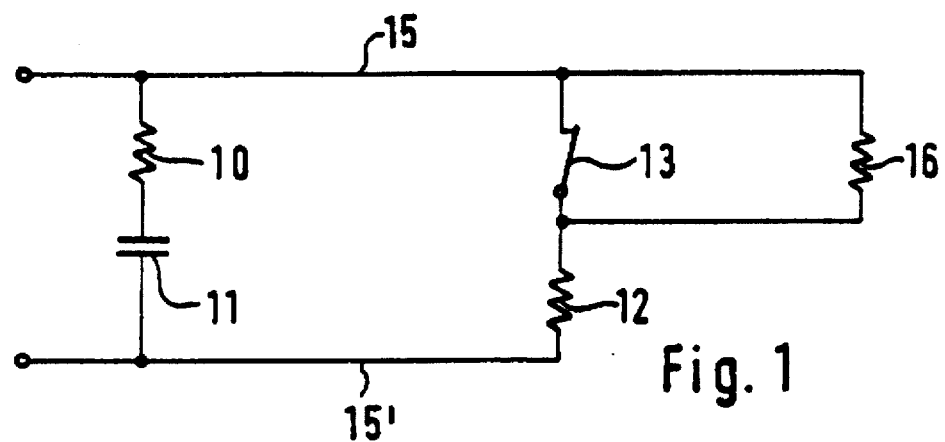
FIG. 1 shows the connection, according to the invention, of a switching element parallel to a firing element.

The solution according to the invention is outlined with reference to the circuit diagram illustrated in FIG. 1. The firing element comprises the series connection of a resistor 10 and a capacitor 11. A switching element 13 with a further resistor 12 which is arranged in series with it is connected in parallel with the firing element. A resistor 16 is located in parallel with the switching element 13. It serves to detect line breaks. The switching element 13 has a break contact, is therefore closed in the quiescent state. The release state of the switching element 13, and consequently the circuit closed by the switching element 13, signals that the seat belt is not inserted into the belt lock. In this way it is possible to test this circuit and detect the operational position of the seat belt. When the seat belt is put on, the switching element 13 is actuated and the circuit is broken. In this way the correct use of the seat belt can be tested. Since the firing current intended for the firing element 10, 11 does not have to be conducted via the switching element 13, a switching element 13 which is configured only for weak current and is substantially more cost-effective can be used. Symmetrical line routing is possible with the arrangement according to FIG. 1, making the coupling-in of differential interference signals significantly more difficult.

What is claimed is:

1. An electronic device comprising a piece of safety equipment for vehicular occupants, having an output stage (32a, 32b, 32c) which comprises a firing element (10, 11), having an insertable seat belt with a fastening device comprising a belt lock that is fastened by inserting a portion of said seat belt in said belt lock, said seat belt having an operational position which is indicative of whether or not said seat belt is correctly inserted into said belt lock, and having a switching element (13) which characterizes the operational position of said seat belt, wherein said switching element (13) is connected in parallel with said firing element (10, 11).

2. The device of claim 1, wherein a resistor (16) is connected in parallel with the switching element.

3. The device of claim 1 wherein connection lines (15, 15') connect said switching element (13) to said firing element (10, 11), which connection lines (15, 15') are of symmetrical design.

4. The device of claim 3, wherein a resistor (16) is connected in parallel with the switching element.

5. The device of claim 1, wherein the switching element (13) is configured for current loading which is less than that necessary to activate said firing element (10, 11).

6. The device of claim 5, wherein a resistor (16) is connected in parallel with the switching element.

7. The device of claim 5, wherein connection lines (15, 15') connect said switching element (13) to said firing element (10, 11), which connection lines (15, 15') are of symmetrical design.

8. The device of claim 7, wherein a resistor (16) is connected in parallel with the switching element.

9. The device of claim 1, wherein the switching element (13) is a switch with a break contact.

10. The device of claim 9, wherein a resistor (16) is connected in parallel with the switching element.

11. The device of claim 9, wherein connection lines (15 15') connect said switching element (13) to said firing element (10, 11), which connection lines (15, 15') are of symmetrical design.

12. The device of claim 11, wherein a resistor (16) is connected in parallel with the switching element.

13. The device of claim 9, wherein the switching element (13) is configured for current loading which is less than that necessary to activate said firing element (10, 11).

14. The device of claim 13, wherein a resistor (16) is connected in parallel with the switching element.

15. The device of claim 13, wherein connection lines (15, 15') connect said switching element (13) to said firing element (10, 11), which connection lines (15, 15') are of symmetrical design.

16. The device of claim 15, wherein a resistor (16) is connected in parallel with the switching element.

* * * * *